United States Patent [19]

Alas

[11] 4,306,817
[45] Dec. 22, 1981

[54] BAR CODE PRINTING MECHANISM

[75] Inventor: Raigo Alas, Guelph, Canada

[73] Assignee: International Telephone and Telegraph Corporation, New York, N.Y.

[21] Appl. No.: 91,057

[22] Filed: Nov. 5, 1979

[51] Int. Cl.³ .............................................. B41J 5/00
[52] U.S. Cl. .................................... 400/103; 400/124; 400/154.5; 400/167; 101/93.02; 101/93.04; 101/93.11; 101/93.44
[58] Field of Search ............... 101/93 R, 93.04, 93.09, 101/93.11, 93.37, 93.44, 93.48, 93.29, 93.3, 93.33, 93.36, 93.43, 93.47, 93.02; 400/124, 154, 154.5, 157.1, 157.2, 157.3, 163, 163.1, 163.2, 163.3, 155, 155.1, 103–106, 125, 125.1; 310/36, 40, 40 MM

[56] References Cited

U.S. PATENT DOCUMENTS

| | | | |
|---|---|---|---|
| 2,554,981 | 5/1951 | Goff | 310/40 R |
| 3,386,378 | 6/1968 | Bradbury et al. | 400/154 |
| 3,406,303 | 10/1968 | Erickson | 310/40 R |
| 3,459,976 | 8/1969 | Nyman | 101/93.29 X |
| 3,493,091 | 2/1970 | Kapp | 400/154.5 X |
| 3,586,953 | 6/1971 | Markkanen | 400/154.5 |
| 3,670,647 | 6/1972 | Funk et al. | 400/167 |
| 3,977,509 | 8/1976 | Leersnijder | 101/93.33 |
| 3,992,688 | 11/1976 | Keck | 310/36 X |
| 4,084,502 | 4/1978 | Heyraud | 101/93.29 |
| 4,152,614 | 5/1979 | Noguchi et al. | 310/40 MM |

FOREIGN PATENT DOCUMENTS

| | | | |
|---|---|---|---|
| 820413 | 3/1975 | Belgium | 101/93.33 |
| 962339 | 4/1957 | Fed. Rep. of Germany | 400/104 |
| 2215478 | 10/1973 | Fed. Rep. of Germany | 101/93.48 |
| 899302 | 5/1945 | France | 400/364 |
| 994103 | 6/1965 | United Kingdom | 101/93.04 |

OTHER PUBLICATIONS

"Print Hammer Drive", IBM Tech. Discl. Bulletin, vol. 11, No. 11, Apr. 1969, p. 1609.
"Universal Product Code Printer", IBM Tech. Discl. Bulletin, vol. 17, No. 5, Oct. 1974, pp. 1451–1452.
"Bar Code Printer", IBM Tech. Discl. Bulletin, vol. 15, No. 12, May 1973, pp. 3794–3795.

Primary Examiner—E. H. Eickholt
Attorney, Agent, or Firm—James B. Raden; Marvin M. Chaban

[57] ABSTRACT

A mechanism using a stepping motor as the prime mover for a bar code printing head or hammer mounted on the end of a pivotal lever. Where the output code (such as the postal code used in the U.S.) requires a full bar as one binary indication and a half bar the other binary indication, two motors each with its own printing head are used. The heads are spaced apart longitudinally relative to an object to be printed. A full bar is made up of two half bars, thus, both motors must be energized at separated time intervals to cause both heads to strike in a single transverse alignment to print a full bar. The lever supporting the printing head is constructed to position its center of percussion essentially in alignment with the printing hammer to minimize wear on the motor shaft.

12 Claims, 12 Drawing Figures

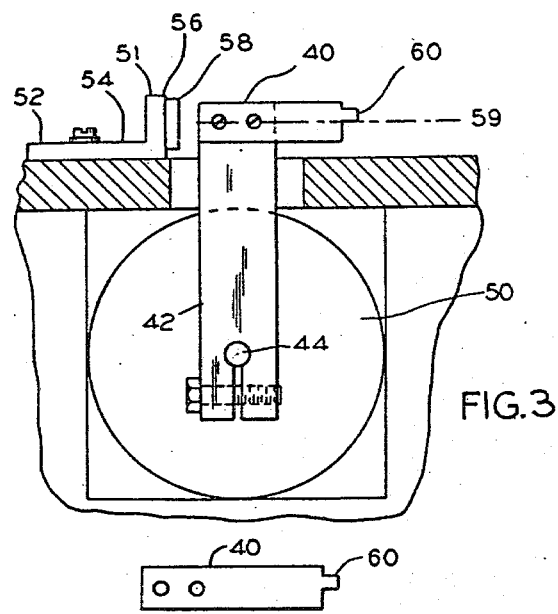
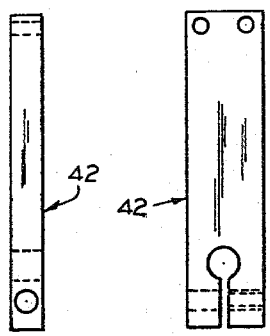
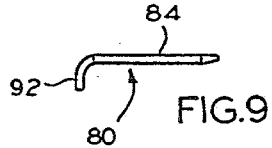
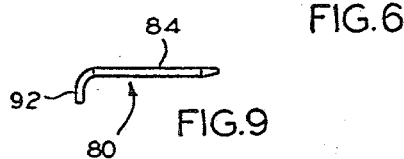
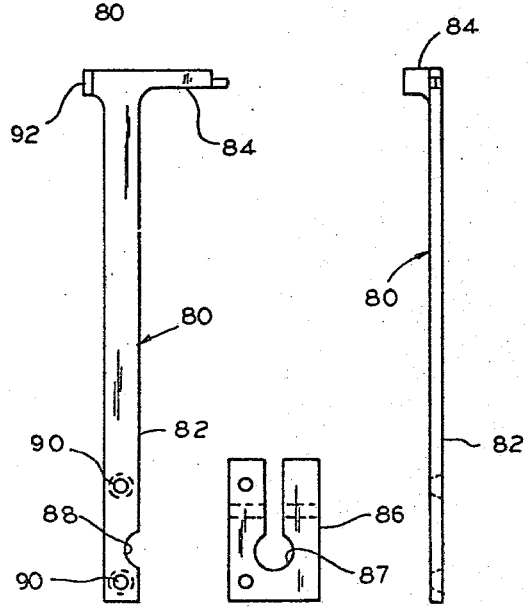
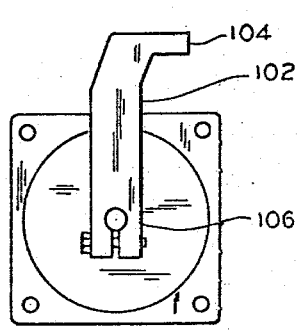
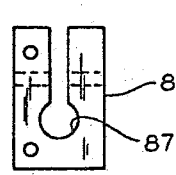

BAR CODE PRINTING MECHANISM

BACKGROUND OF THE INVENTION

Printing hammers or heads have been driven by many different drives or prime movers. U.S. Pat. No. 3,726,213 shows a mechanism using an electromagnetic drive to attract an armature and drive a print head through an arc. The print strikes an inked tape to impress the character on a target surface. A return spring is used to restore the print head to its at rest condition. Naturally, the effect of this spring must be overcome by the attractive force of the magnet on the armature on the forward or drive stroke.

Belgian Patent No. 820,413 shows a printing hammer construction using straight line motor. Solenoid type action is generated by coils acting on a disc positioned between the coils. The disc has the printing hammer coaxially mounted thereon for reciprocatory movement along the coil and disc axis. A leaf spring is secured to the hammer body and the coil housing structure to restore the hammer to its at rest condition. Naturally, the effect of this spring must be overcome by the attractive force to complete the driving stroke of the hammer.

SUMMARY OF THE INVENTION

The invention is directed to an improved printing head or printing hammer for imprinting a single character on a target, the hammer being driven by a reversible stepping motor. The motor is operated in the forward direction to imprint and operated in the reverse direction to restore.

It is a further object of the invention to provide a bar code printer for imprinting a code of a full bar representing one character and a half bar representing another character. The printer employs two printing heads, each designed to imprint a separate portion of a full bar, and a designated one of which is operated to imprint a half bar. Each printing head is driven by a reversible stepping motor operable through a predetermined arc on an operative or printing stroke thereof and through a like arc on the return stroke.

Within a mechanism employing the objects of the invention, a lever arm is affixed to the motor drive shaft for step rotation therewith, the lever arm having been designed for length and mass to locate the center of percussion or impact of the lever essentially at the level of the printing head thereby minimizing joining forces acting on the motor shaft.

It is a further object to provide separate printing heads for combinedly forming a character, the heads being spaced longitudinally along the path of travel of a target object to be printed with the character. The operation of the forwardmost head is delayed for a period of time sufficient to allow the target object to have moved a distance approximately equal to the spacing between heads.

To accomplish these and other objects, the invention is directed to a mechanism for imprinting bar code data on a target object such as a letter envelope passing being transported past the mechanism. Interposed between the object and the printing head or heads is an inked tape which is struck by the head to transfer an inked character similar to the shape of the head onto the target object.

One major use for the present invention is in the field of imprinting envelopes with an optically readable bar code, the code representing the zone or zip code to which the envelope is addressed. Such printers and readers are well-known in the art and presently take many forms for the various national code formats.

Of the codes system in use, the Canadian postal code field uses a fluorescent ink imprinted by a comparatively large rectangular block, with a binary one represented by an imprinted bar and a binary zero represented by an absence of a bar. The U.S. postal code field uses a full imprinted bar as the binary one, and a bottom imprinted half-bar as the binary zero representation. The bar in use for the U.S. code field is considerably smaller than that of the Canadian field and uses conventional ink rather than the Canadian fluorescent dye.

The present invention is equally applicable for either of these codes or for any similar binary code. The present mechanism is acoustically considerably quieter than known linear reciprocatory mechanisms, as currently used in bar code printers. With the system as shown, the base alignment of the bars can be maintained accurately and positioning of the bar imprints longitudinally can be readily adjusted if necessary.

BRIEF DESCRIPTION OF THE DRAWINGS

FIG. 3 is a sectional view taken along line 3—3 of FIG. 2;

FIG. 4 is a side view in elevation of the clamp arm of FIGS. 1-3;

FIG. 5 is a front view of the clamp arm of FIG. 4;

FIG. 6 is a side elevational view of the printing head lever of FIGS. 1-3;

FIGS. 7, 8 and 9 are side, front and top elevational views of an alternate printing head lever usable in place of the head lever of FIG. 6;

FIG. 10 is a side view in elevation of a clamp for use with the lever of FIGS. 7-9;

FIG. 11 is a perspective view of a motor using a further printing head lever.

DETAILED DESCRIPTION OF THE DRAWINGS

Figure 1:
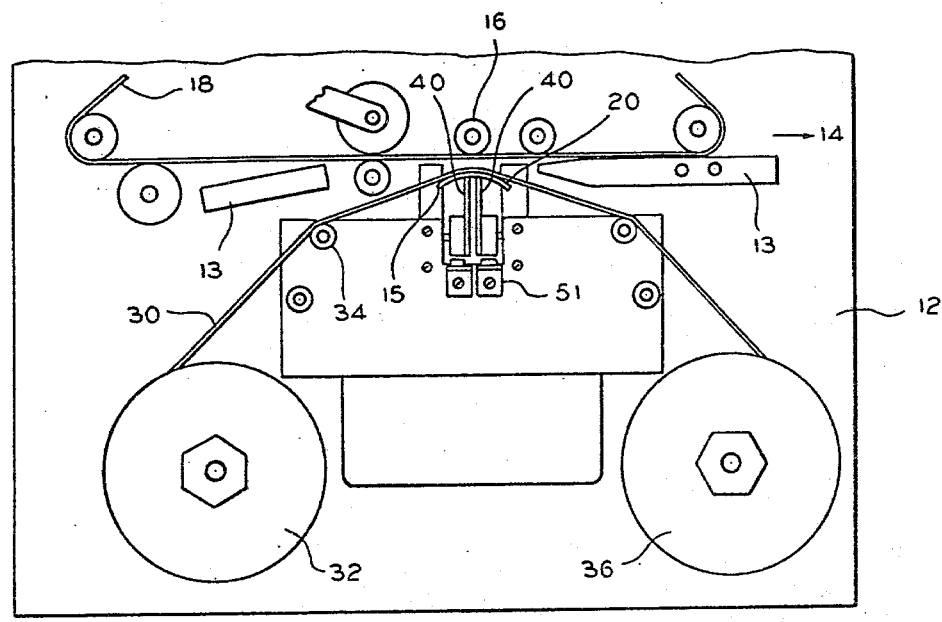
FIG. 1 is a plan view of a portion of a printing station employing my invention.

In FIG. 1, I show a printing mechanism which is adapted to be mounted at an imprinting station such as used for producing an optically readable binary code.

In the showing of FIG. 1, there is a table 12 on which is mounted an upright discontinuous wall 13 defining a travel path for an object such as an envelope being transported across the table in the direction of the arrow 14. A series of rollers 16 driven by an endless belt 18 in known fashion transport the envelope between the wall and an object positioning holder and guide 20. The guide has a window or opening through which a portion of the envelope or target object is visible. An object such as a letter as it is transported is held on the reverse side by the rollers 16 so that the letter may be imprinted on the front side through the guide window.

An inked ribbon 30 is fed from a feed spool 32 or roller past idlers 34 on the holder and guide to the take up spool 36. The ribbon is indexed as necessary to provide a fresh inked area for each imprinting.

The mechanism described to this point is conventional and is considered to be known in the art, especially as related to postal mechanization.

Figure 2:
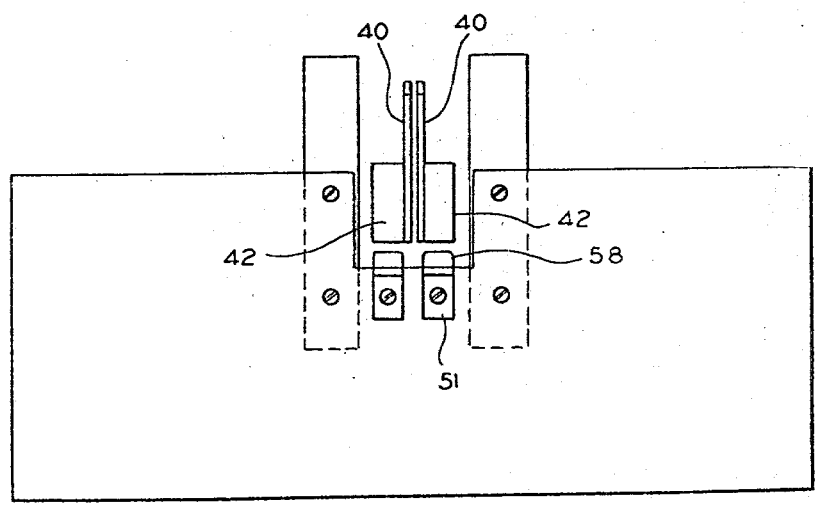
FIG. 2 is a plan view of the printing mechanism of FIG. 1 shown in greater detail.

The imprinting apparatus includes an imprint head 40 disposed essentially horizontally as viewed in FIGS. 1-3. The head is mounted within a clamp member 42 extending essentially vertically from the print head to its securement on the shaft 44 of step motor 50 (FIG. 3).

As can be seen in FIG. 1, there are two such print heads 40 mounted in parallel each secured within its lever 42 and each lever clamped suitably on the shaft of its individual step motor. Each such motor is an off-the-shelf item which may be purchased from such manufacturers as the Sigma Instruments Co. Such motors operate at high stepping rates, are capable of high torque operation, are reversible and may be obtained in a number of torque and step sizes. The particular type found to be successful is that employing 1.8° angular arc step.

A separate backstop 51 is provided for each print head. Each backstop includes an L-shaped body 52, with a base section 54 mounted on the table 12. The base section mounting uses a bolt passing through an elongated slot in section 54 (to enable adjustment of the reverse stroke of the print head) and tightened into a threaded hole in the table. The upright 56 of the backstop body is positioned behind the lever and the upright is suitably padded with a pad 58 of energy absorbing material such as felt or elastomer. The pad is positioned to be struck by the lever on its reverse or retraction stroke to absorb the excess kinetic energy from the lever and head (the combination being called the print lever) and from the motor shaft or rotor assembly.

The two separate printing heads 40 are used for the U.S. postal printing code in which the character to be printed on the target object is either a full bar or a half bar, a fully bar representing a binary one and a half bar representing a binary zero of the code. In one approach, one bar may be a full bar and the other a half bar. The preferred approach shown herein is that of having each head print a half bar. In this preferred approach, the left head (as viewed in FIGS. 1 and 2) is the top half head and the right head is the lower head. Thus, for a half bar, only the right head is advanced to imprint and for a full bar, both heads must be actuated at separate but related synchronized times.

In this manner, the bottom margin of the code bar series may be maintained in accurate alignment and the alignment of half bars to one another to constitute a full bar may be readily observed, measured and controlled by control of the timing between synchronization of operations of the two motors. This latter adjustment may be performed electrically as will be explained later.

As seen best in FIG. 3, a head is positioned essentially horizontally with the imprinting tip 60 or bit at the exposed end. The tip 60 is slightly offset from the centerline of the head defined by the alignment of holes for mounting the head to the lever. When the head is positioned with the bit above the centerline, the top half bar is provided. For the bottom half bar, the standard head is provided and is mounted inversely. The head, as mentioned, is asymmetric relative to the centerline with the center of the tip bit below the centerline. The imprint left by the head above the centerline provides a top half bar and the imprint of the head below the centerline provides the bottom half bar. A full bar formed by a top half imprint aligned with a bottom half imprint contains an area of overlap at the centerline to enable visual gauging and adjustment of the bar imprint positions.

The mass and length of the lower arm have been carefully calculated to position the printing head 60 at approximately the center of percussion based on the motor shaft as the mounting axis. In this way, the maximum force may be attained along the head axis while minimizing the impact on the motor shaft and its bearings.

FIGS. 4 and 5 show the clamp member 42 which is a rectangular prism of thickness and mass. Adjacent its bottom end, a circular bore 62 extends through the clamp to receive the motor shaft. A slot 64, radial to the bore axis, bifurcates the clamp end to allow a bolt 66 to squeeze the bifurcations 68 and secure the clamp on the motor shaft. The upper end of the clamp has a pair of aligned threaded holes 72 parallel to the bore forming the axis 59 of the print head 40. Screws 74 threaded into the holes in the clamp hold the printer head in the manner shown in FIG. 3.

The printer head is shown in FIG. 6 adapted to mount on the clamp member 44 by means of screws 74. The bit in FIG. 3 is positioned for printing the upper half of a bar. The bar is of uniform thickness throughout including the imprinting bit. As mentioned, the bit is off-centered from the head axis so that one head may be used for both applications (top half and bottom half). Its mounting with the bit either above the centerline axis or below determines the half imprinted.

In FIGS. 7-9, I show an alternate form of lever 80 which is essentially T-shaped with a main body 82 and a crosshead 84. Using lever 80, a clamp similar to that shown in FIG. 3 is used, the clamp 86 being that of FIG. 10. Clamp 86 has a bore 87 for the motor shaft, the shaft fitting into the semi-circular concavity 88 of lever 80. The lever 80 has two holes 90 for mounting to the clamp.

The crosshead 84 of the lever has an L-shaped projection 92 extending from the main body. This projection or extension is positioned to engage the backstop pad 58 and thereby distribute the force of the lever on the backstop during the retracting step of the lever. The height of the extension 92 is greater than that of the crosshead to provide greater force distribution. The imprint head or bit may be tapered portion of the front end of the lever.

The lever 80 is longer than that of the lever of or lever and clamp of FIG. 3 to minimize the length difference between the upper half bit imprinter and the lower half bit imprinter. Further, the greater length provides greater lever travel for bulky or bulged envelopes.

In FIG. 11, I show a typical lever arm 102 and motor for printing Canadian code. Again, there is a motor for driving the lever through a stroke of approximately 1.8° of arc. The lever arm 102 has a greater imprint area 104 than the head for a U.S. code head. The lever arm is a unitary arm with a clamp section 106 at its lower end for clamping to the motor shaft and an imprint head at the other end. The operation of this type of imprint head is similar to that previously described.

Figure 12:
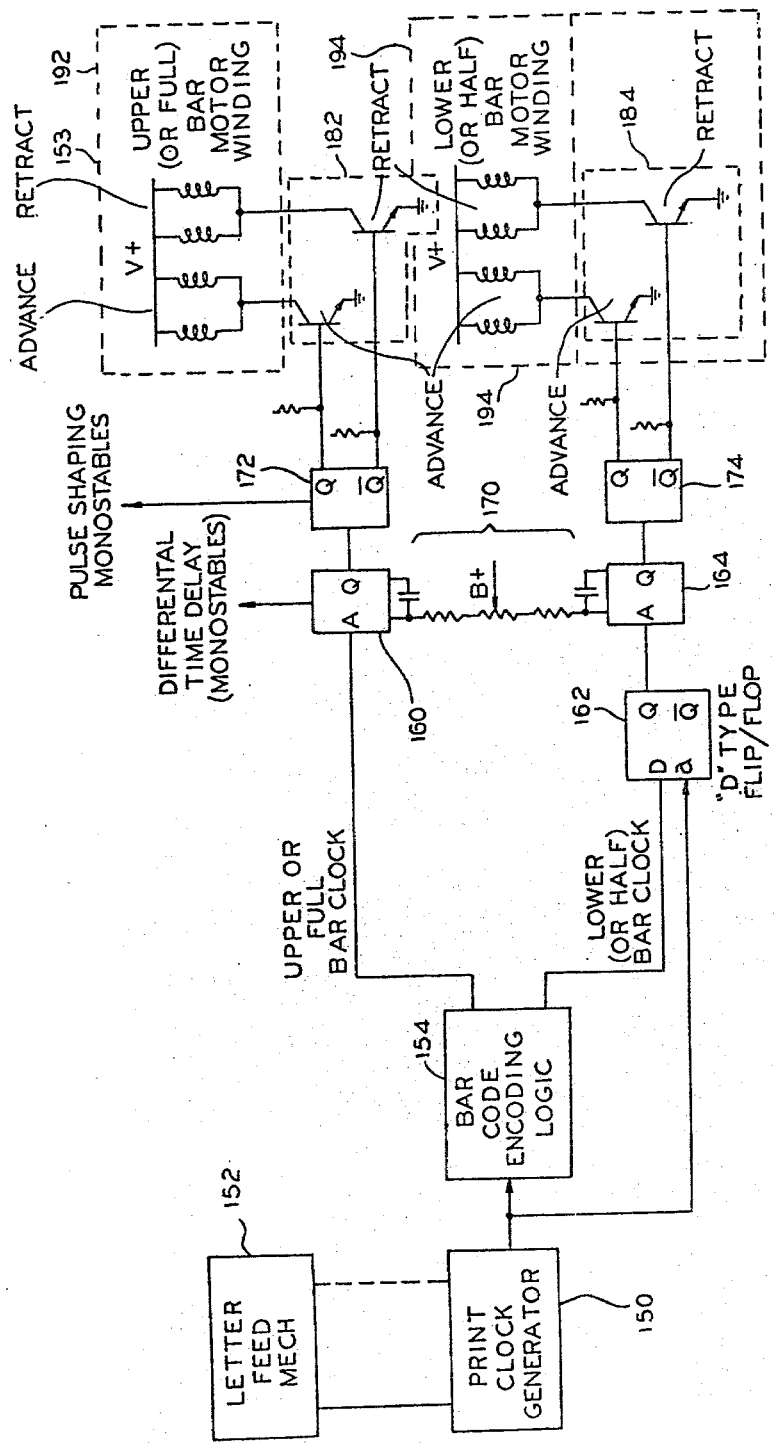
FIG. 12 is a circuit for operating the mechanism shown herein for providing a U.S. Postal code imprint.

FIG. 12 shows in block form a circuit for operating a code imprinter for the U.S. postal code of bars and half bars. A printing code clock 150 drives both the letter feed mechanism 152 for operating the letter transport belt 18 and the motor mechanism 153 for imprinting. The path to the motor mechanism 153 can be traced through the logic for bar code encoding, as represented by box 154. By using the common clock for both letter travel and imprint, the two actions are synchronized. A path from the logic may be traced to a monostable 160 for the upper bar for imprinting that half bar when directed by logic 154. The path to the lower half bar control passes through a flip-flop 162 to provide a time delay between the operation of monostable 160 for the upper bar and monostable 164 for the lower bar. Thus, the operation of the lower bar is delayed by a timed interval related to and derived from the print clock period. An adjustable voltage divider 170 is connected between the monostables to enable setting of the delay between operation of the monostables and provide a continuously variable differential delay circuit. The delay circuit allows precise matching of the upper and lower half bar imprints by setting the time delay accordingly. Each monostable has as its output a pulse shaping monostable 172 and 174 respectively for forming a square wave to the respective drivers 182 and 184 for the motor windings. Each motor has two drivers, one for each direction of operation, each driver controlling respective windings such as advance windings or retract windings of motor 192 or like windings of lower half motor 194.

Thus, the logic 154 controls when either upper, lower or both motors are to be energized and the direction in which the motor is to be rotated. The flip-flop 162 in the lower half bar path provides a delay of one cycle for the lower half when applicable. The divider network determines the amount of delay between operation of the monostables.

To imprint a letter using the U.S. code of bars and half bars, the leading edge of the letter passes a photocell to enable the printing circuitry. At a suitable timed period after the circuit has been enabled, the upper or full bar monostable 160 is energized in the forward direction to operate the advance transistor of driver 182 to operate the advance windings of motor 192. The motor steps 1.8° to impact the inked ribbon and print the upper half of the first bar. The retract transistor of driver 182 is thereafter activated to energize the retract winding and step the motor backward. The lever strikes the backstop pad and the motor is held energized in this retracted condition until the next forward step or until the upper bar unit is deenergized.

When the printed half bar is adjacent the lower half bar head as indicated by the time delay imposed by flip-flop 162 and divider 170, monostables 164 and 174 are pulsed to operate the advance transistor of lower head driver 184. The driver energizes the advance windings of motor 194 to step the lower bar motor and pivot the lower head bar to imprint the lower half bar. With the proper time delay, the lower half bar will be imprinted in alignment with the previously printed upper half bar to form a full bar. The retract transistor is thereafter actuated to step the motor in the retract direction and hold the lever arm retracted until the next energization.

By the use of reversible motors, there is no need for retracting springs to be overcome by the advance step and the motor force can be applied to the imprinting process.

As mentioned by using the two half bars to create a full bar, the alignment of the bottom of the bars will be uniform and even.

The mounting of a lever arm to the motor makes a rigid body so that the printing head lever may be structured in length and mass to position the center of impact of the rigid body substantially along the axis of the print head or bit.

As described, upper and lower half bars or full and half bars can be combined into a code of uniform pitch by actuating first one print head, but delaying the actuation of the second head until the imprint of the first head has been transported to a location opposite the second head. This alignment can be easily achieved by delaying the digital signal for actuating the second head by one or more printing clock pulses depending on the separation between the heads (i.e. the number of pitch intervals).

Individual stepping motors of a given type may not have precisely the same speed of response, and it may not be practical to locate the two heads precisely an integral number of pitch intervals apart. Therefore, the drive circuitry of this printer includes a delay circuit by which the delay may be adjusted in operation to precisely match the upper and lower half bar imprints, or to precisely adjust the spacing of the full bar half bar imprints.

I claim:

1. Printing apparatus comprising a printing head configured with indicia to be printed, drive means for said head including a lever arm on which said head is secured, reversible motor means steppable in steps of predetermined finite angular extent on each energization thereof, means mounting said lever arm to the output member of the motor means for advance of the printing head in a print stroke responsive to each energization of the motor means in one direction of energization and for retracting said printing head on each energization of the motor means in the reverse direction.

2. Apparatus as claimed in claim 1, in which there is means positioned adjacent one side of said lever arm and adapted to be struck by said lever arm to terminate the retraction thereof, said last-mentioned means comprising a pad of energy absorbing material adjacent the end of the lever arm remote from its mounting to the output member of motor means.

3. Apparatus as claimed in claim 2, in which the printing head is located approximately on the center of impact of the lever relative to its mounting to the output member of the motor means, and in which said energy absorbing pad is located substantially of the center of impact on the one side of the lever arm.

4. Apparatus as claimed in claim 3, in which there is means for mounting said pad in a stationary position adjacent said one side of said lever arm, and there is means for adjusting the position of the pad relative to the one side of the lever arm.

5. Apparatus as claimed in claim 1, in which there is means for moving an object to be imprinted in a travel path past the printing head as the head advances in a printing stroke, means for controlling the energization of the motor means in a sequence of energizations to generate an alignment of printed indicia and in which there is a common control for said moving means and said controlling means to generate spaced apart imprints in said alignment.

6. Apparatus as claimed in claim 5, in which there is a second print head parallel to said first-mentioned head, motor means and a lever arm for operating said second print head to imprint the object with indicia out of the alignment indicia of the first-mentioned head but overlapping therewith.

7. Apparatus as claimed in claim 6, in which said second head is aligned along the object travel path spaced from the first-mentioned head a distance to be traversed by the object during a timed interval, and said controlling means includes means for adjusting the energizations of the first-mentioned and second heads whereby an alignment of indicia comprised of imprints from one of said heads and both of said heads may be produced.

8. Bar code printing apparatus comprising a guide for aligning an object having a surface for imprinting thereon bar code data, means for transporting said object past said guide at a predetermined rate, a first and a second stepping motor adjacent said guide, said first motor having a lever mounted thereto for reciprocal pivotal motion in response to respective energizations of the first motor in advancing and retracting directions, said second motor having a lever mounted thereto for reciprocal pivotal motion in response to respective energizations of the second motor in advancing and retracting directions, said first motor lever arm and said second motor lever arm being mounted parallel to one another and spaced apart a distance in the direction of transport of the object, each said lever arm including a print head having respective transverse halves of a bar to be imprinted such that imprinting of a full bar includes energization of the first and second motors in the advancing direction at time intervals synchronized with the rate of transport of the object to align the imprint from the bars in an alignment transverse to the transport path of the object.

9. A bar code printing apparatus as claimed in claim 8, in which a print code comprised of bars and half bars is completed by respective energizations of said motors.

10. A bar code printing apparatus as claimed in claim 8, in which there is energy absorbing means on the side of the lever arm opposite the print head positioned to be struck by one or both lever arms in response to energization of the respective motors in the retracting direction.

11. A bar code printing apparatus as claimed in claim 10, in which the energy absorbing means and the print heads are positioned at the respective center of percussion of the lever arms.

12. Bar code printing apparatus comprising a printing head configured with a bar to be printed on an object being transported past the printing head, means for advancing and retracting said head including a lever arm on which said head is secured, a reversible motor steppable in steps of predetermined finite angular extent on energization thereof, the direction of a step responsive to the direction of energization of the motor, means mounting said lever arm to the output shaft of the motor to advance the printing head in a print stroke to imprint a bar on the object responsive to each energization of the motor in the advancing direction of energization and for retracting said printing head on each energization of the motor in the reverse direction, a pad of energy absorbing material spaced from the lever arm a distance in the retract direction, with means mounting said pad in settable positions to adjust the retract stroke of the lever arm.

* * * * *